United States Patent [19]

Takatu et al.

[11] Patent Number: 5,475,529
[45] Date of Patent: Dec. 12, 1995

[54] OPTICAL AMPLIFIER

[75] Inventors: Tatuhiko Takatu, Tokyo; Kazuo Aida, Yokohama; Kiyoshi Nakagawa, Miura, all of Japan

[73] Assignees: Ando Electric Co., Ltd.; Nippon Telegraph and Telephone Corporation, both of Tokyo, Japan

[21] Appl. No.: 443,020

[22] Filed: May 17, 1995

[30] Foreign Application Priority Data

May 25, 1994 [JP] Japan ..................... 6-111547

[51] Int. Cl.$^6$ .................................................. G02F 1/35
[52] U.S. Cl. .......................... 359/341; 359/337; 359/177
[58] Field of Search .................................... 359/341, 337, 359/177

[56] References Cited

U.S. PATENT DOCUMENTS

| | | | |
|---|---|---|---|
| 5,299,048 | 3/1994 | Suyama | 359/179 |
| 5,374,973 | 12/1994 | Maxham et al. | 359/341 |
| 5,428,471 | 6/1995 | McDermott | 359/177 |

*Primary Examiner*—Mark Hellner

*Attorney, Agent, or Firm*—Finnegan, Henderson, Farabow, Garrett & Dunner

[57] ABSTRACT

A high fidelity optical amplifier having a stable amplification gain is presented. The problem of signal distortion in an output optical signal caused by an imbalance of light energy generation and consumption within the optical fiber is resolved by generating a delayed correction signal to be used in a feedback control circuitry. An incoming optical signal is split into two signals: one split signal is forwarded to a photo-detector element for generation of the correction signal while the other split signal is forwarded to a signal delay circuit. The optical delay circuit delays the timing of inputting the correction signal into output optical fiber for a specific duration of time to attain a full amplification gain within the optical fiber. The correction signal generation circuit performs differentiation of an electrical input signal followed by detection and selection of a maximum amplitude over a standard reference voltage. The selected signal acts as trigger to the pulse generation circuit and waveform correction circuit in conjunction with a variable-gain amplifier to provide a correction signal to maintain the amplification gain of the optical fiber at a constant level. The resulting output signal is distortion-free and stable over a prolonged period of time.

2 Claims, 6 Drawing Sheets

CORRECTION SIGNAL

FIG.2B

OUTPUT FROM OPTICAL AMPLIFIER

OPTICAL SIGNAL

FIG.6B

OUTPUT FROM OPTICAL AMPLIFIER

FIG.7

OUTPUT FROM OPTICAL AMPLIFIER

FIG.8

OPTICAL AMPLIFIER

BACKGROUND OF THE INVENTION

1. Field of the Invention

The present invention relates to an optical amplifier which amplifies a light signal inputted into one end of a rare-earth doped optical fiber by transforming an excitation light injected from the other end of the rare-earth doped optical fiber into an excitation energy.

2. Technical Background

Figure 5:
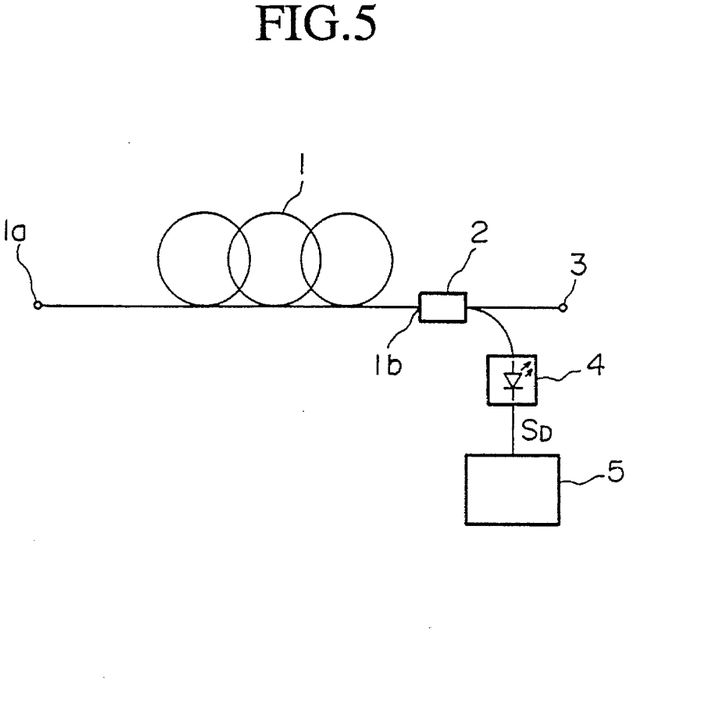
FIG. 5 is a schematic representation of a first example of the conventional optical amplifier.

FIG. 5 is a schematic diagram of a first example of a conventional optical amplifier. A rare-earth doped optical fiber 1 (shortened to optical fiber 1 hereinbelow) is produced by doping an optical fiber material with rare-earth elements, for amplifying an input optical signal inputted into one end 1a of the optical fiber 1. The other end 1b of the optical fiber 1 is optically connected to an optical coupler 2. The optical coupler 2 is for guiding the input optical signal from the one end 1a of the optical fiber 1 to the optical output terminal 3 as well as for injecting an excitation light generated by the excitation light source 4 into the optical fiber 1 into the other end 1b of the optical fiber 1.

The excitation light source 4 is driven by an excitation light source driving signal $S_D$ supplied from the excitation light source driving circuit 5, and generates an excitation light having a light energy of a constant light intensity. The excitation light generated by the excitation light source 4 is injected into the optical fiber 1 from the other end 1b of the optical fiber 1 through the optical coupler 2. The light energy supplied by the excitation light, injected into the optical fiber 1, is transformed into an excitation energy to be accumulated therein, and is utilized as an excitation energy for effecting optical amplification. The optical fiber 1 acts as an optical amplifier by transforming the accumulated excitation energy to an optical energy signal having the identical wavelength and phase characteristics to the optical signal inputted into the one end 1a of the optical fiber 1. The amplified optical signal is outputted from the optical output terminal 3 through the optical coupler 2.

Figure 6A:
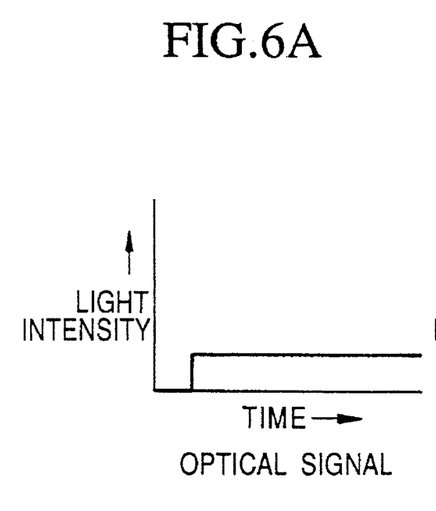
FIG. 6A shows an example of an optical signal to be amplified.

The optical gain through light amplification within the optical fiber 1 is dependent on the amount of excitation energy accumulated in the interior of the optical fiber 1. Therefore, in this type of optical amplifiers, when an input optical signal such as the one shown in FIG. 6A is inputted into the one end 1a of the optical fiber 1, produces an output optical signal having a distorted waveform shape, such as the one shown in FIG. 6B.

The reason for this behavior of light signal outputted from the optical amplifier of the type shown in FIG. 5 will be explained in the following. First, when there is no input optical signal from the one end 1a of the optical fiber 1, the optical energy emitted from the excitation light source 4 and injected into the optical fiber 1 is not utilized to amplify any light signal even when it is transformed into excitation energy within the optical fiber 1. Therefore, the excitation energy becomes accumulated within the optical fiber 1. As explained above, because the degree of light amplification (optical gain) of optical fiber 1 is dependent on the amount of excitation energy accumulated, the optical gain increases as the amount of excitation energy accumulated within the optical fiber 1 increases.

As explained already, the optical energy supplied by the excitation light injected into the other end 1b of the optical fiber 1 is transformed into excitation energy to be utilized for light amplification within the optical fiber, however, a part of the excess excitation light is emitted from the one end 1a as a leakage light signal. Furthermore, a part of the excess excitation energy accumulated within the optical fiber 1 produces natural emission light in the interior of the optical fiber 1, and is discharged from the optical fiber 1.

The amount of excitation energy accumulated within the optical fiber 1 having no signal input from the one end 1a reaches a steady value determined by the balance among the light energy injected from the other end 1b, leakage light and natural emission light. Therefore, the optical gain of an optical fiber 1 having no input signal assumes a large steady state value.

Figure 7:
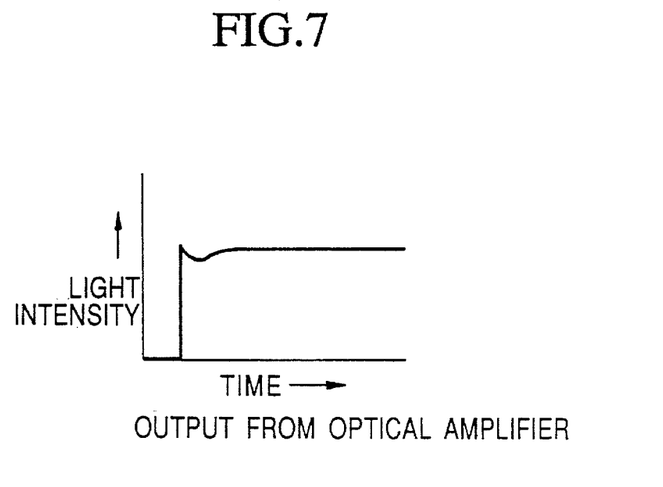
FIG. 7 shows an example of the waveform of the optical signal outputted from the optical output terminal shown in FIG. 5.

When an optical signal is inputted into the one end 1a of the optical fiber 1 in the condition described above, because the capacity for light amplification of the optical fiber just prior to the optical signal input event is high, an output optical signal of a high intensity is outputted from the output optical signal from the optical output terminal 3, as shown in FIG. 7. The amount of excitation energy consumed by the light amplification process is larger than the light energy of the excitation light injected from the other end of the optical fiber 1, therefore, the excitation energy accumulated within the optical fiber 1 is consumed by the process of optical amplification, and the residual amount decreases, thereby leading to a lower light amplification of the input light.

The result is that, in spite of the fact that the input optical signal at the one end 1a of the optical fiber 1 has a constant light intensity, the output light intensity from the other end 1b of the optical fiber 1 decreases. Subsequently, a balance is reached between the consumption of excitation energy due to optical amplification and the supply of light energy from the excitation light source 4 is achieved, and a steady state is produced.

Figure 6B:
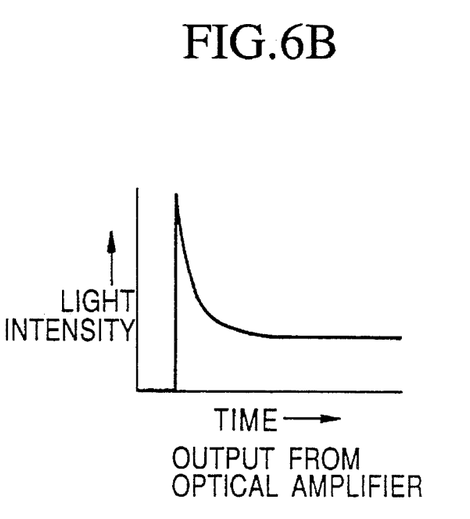
FIG. 6B shows an example of the waveform of the optical signal outputted from the optical output terminal shown in FIG. 5.

As explained above, the degree of light amplification of an optical fiber 1 excited with an excitation light of a constant intensity exhibits a transitory behavior with respect to a rectangular waveform as shown in FIG. 6A, leading to a distorted output waveform such as the one shown in FIG. 6B. The transient period of the output signal variation can last from several hundreds of micro-seconds to as high as several milli-seconds.

Therefore, to obtain an optical signal having no waveform distortion from an optical amplifier, it is necessary to maintain a steady optical gain within the optical fiber 1. A conventional optical amplifier having a provision for maintaining a steady light amplification in an optical fiber 1 will be explained with reference to FIG. 8. Those components in FIG. 8 which are the same as in FIG. 5 are referred to by the same reference numerals.

Figure 8:
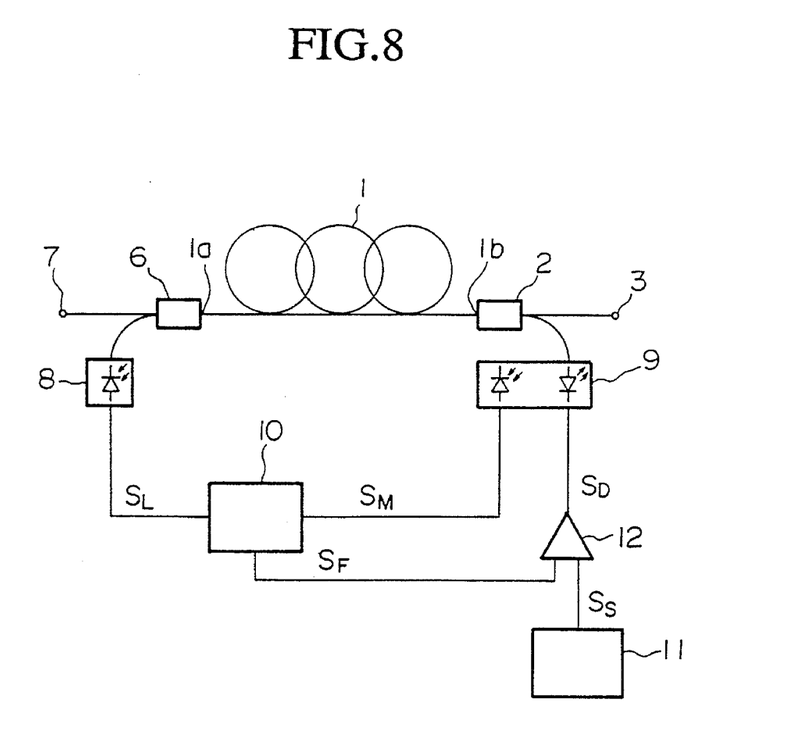
FIG. 8 shows a second example of the conventional optical amplifier.

In FIG. 8, the one end 1a of the optical fiber 1 is optically connected to a optical input terminal 7 through a wavelength multiplexer 6. The wavelength multiplexer 6 performs the task of inputting an input optical signal (to be amplified), received from the optical input terminal 7, into the one end 1a of the optical fiber 1 as well as inputting the leakage light signal from the optical fiber 1 into a photodetector element 8. The optical coupler 2 guides the light signal outputted from the other end 1b of the optical fiber 1 to the optical output terminal 3, and inputs excitation light emitted from the excitation light source 9 having a monitor to the other end 1b of the optical fiber 1.

The excitation light emitted from the monitor-equipped excitation light source 9 is injected into the other end 1b of the optical fiber 1 through the optical coupler 2. The light energy supplied by the excitation light which is injected into the optical fiber 1 from the monitor-equipped excitation light source 9 is transformed into excitation energy within the optical fiber 1, and is accumulated in the interior of the optical fiber 1 to be utilized as excitation energy for light amplification. The optical fiber 1 performs the task of optical amplification by transforming the excitation energy accumulated within to an optical signal having identical wavelength and phase characteristics to the input optical signal inputted from the one end 1a of the optical fiber 1. The amplified optical signal is outputted from the optical output terminal 3 through the optical coupler 2.

The electrical signals required for controlling the optical gain of the optical fiber 1 are a monitor signal $S_M$ which is proportional to the light intensity of the excitation light emitted from the monitor-equipped excitation light source 9 and a leakage signal $S_L$ which is proportional to the light intensity of the leakage light signal emitting from the optical fiber 1. The division circuit 10 performs the division of leakage signal $S_L$ with the monitor signal $S_M$. The output signal from the division circuit 10 is proportional to the optical gain of the optical fiber 1.

Therefore, by feeding back the output signal from the division circuit 10 to the monitor-equipped excitation light source 9, it is possible to maintain the degree of light amplification of the optical fiber 1 at a constant level. This is performed by driving the monitor-equipped excitation light source 9 with an excitation light source driving signal $S_D$ obtained by dividing a sum of an inverse output signal $S_F$ from the division circuit 10 and a standard signal $S_S$ generated from the standard electrical source circuit 11 so as to stabilize the optical gain of the optical fiber 1.

One of the problems in the conventional feedback type optical amplifier shown in FIG. 8 is that the degree of light amplification can be stabilized when the light intensity of the optical signal inputted into the optical input terminal 7 is either constant or changing slowly.

However, when the light intensity of the input signal into the optical input terminal 7 increases quickly as illustrated in FIG. 6A, the feedback control alone as shown in FIG. 8 gives rise to a waveform distortion of the output light from the optical output terminal 8 as illustrated in FIG. 7. This is because the excitation energy within the optical fiber 1 is consumed by the amplification process of the input optical signal, and the feedback control by the control elements 8–10 and 12 are not able to respond in time to compensate the lowered optical gain caused by the rapid rise in input light intensity. In other words, there is a time delay in increasing the light energy supply to compensate the drop in the excitation energy in the optical fiber 1, thus leading to a temporary drop in the amplification gain in the optical fiber 1.

There are two reasons for the time delay in feedback control of the circuit design presented above. First, the transformation process of the excitation light into light energy is a time-dependent process, and second, the leakage light signal is dependent on the accumulated light energy in the optical fiber 1. Therefore, the waveform of the leakage signal $S_L$ is related to an integral of the light intensity of the input optical signal, and consequently the feedback signal $S_F$ can only change gradually. Therefore, there is a problem that the feedback control technique for a shot type waveform (e.g. rectangular) inevitably results in a distorted amplification gain.

Furthermore, so long as a circuit of the type illustrated in FIG. 8 is used for feedback control, it is not possible to resolve the time delay problem of amplification gain. This is because of the inherent problem of time-dependent process in transforming the light energy of the excitation light to excitation energy and in the delayed response in the leakage light signal. It follows that even if the components of the feedback control circuit, such as the photodetector elements 8, monitor-equipped excitation light source 9, division circuit 10 and the addition circuit 12 are changed to faster performing devices, the response time of the feedback control circuit cannot be expected to be improved significantly.

SUMMARY OF THE INVENTION

The objective of the present invention is to present a high fidelity optical amplifier which provides a stable amplification gain regardless of a rapid rise in the light intensity of an incoming optical signal.

The objective is achieved in an optical amplifier comprising: a rare-earth doped optical fiber produced by doping an optical fiber material with rare-earth elements; a first photodetector element for converting an optical input signal to a first electrical signal; a wavelength multiplexer for inputting the optical input signal into one end of the rare-earth doped optical fiber, and for inputting a leakage signal emitted from the one end of the rare-earth doped optical fiber into the first photodetector element; a monitor-equipped excitation light source for generating an excitation light, and for generating a monitor signal in proportion to a light intensity of the excitation light; an optical coupler for guiding an optical signal outputted from other end of the rare-earth doped optical fiber to an optical output terminal, and for inputting the excitation light into the other end of the rare-earth doped optical fiber; an excitation light source driving circuit for driving the monitor-equipped excitation light source in accordance with the monitor signal and the first electrical signal so as to amplify the optical input signal by a process of accumulating excitation energy within the rare-earth doped optical fiber by transforming light energy, supplied by the excitation light injected into the other end of the rare-earth doped optical fiber, to excitation energy and converting the excitation energy to an optical signal having wavelength and phase characteristics identical to the wavelength and phase characteristics of the input optical signal inputted into the one end of the rare-earth doped optical fiber;

wherein the optical amplifier is provided with an optical splitter for splitting an incoming optical signal to be amplified into a first split signal and a second split signal; a second photodetector element for converting the first split signal produced by the optical splitter to a second electrical signal; a correction signal generation circuit for generating a correction signal in accordance with the second electrical signal; and an optical delay circuit for delaying the second split signal for a specific duration of time prior to inputting into the wavelength multiplexer; and wherein the excitation light source driving circuit regulates operation of the monitor-equipped excitation source in accordance with the monitor signal, the first electrical signal and the correction signal.

According to another aspect of the present invention, an optical amplifier comprises: a differentiation circuit for differentiating the second electrical signal with respect to time to generate a differential signal: a comparator for comparing the differential signal with a standard voltage; a pulse generation circuit, for generating a pulse signal having a constant pulse width, operated by an output signal from the comparator acting as a trigger signal; a waveform correction circuit for differentiating and detecting the pulse signal to generate a signal having a specific waveform; a maximum value retention circuit for retaining a maximum value of the second electrical signal; a variable-gain amplifier for amplifying the signal having a specific waveform generated by the waveform correction circuit in accordance with an output signal from the maximum value retention circuit to generate a correction signal.

According to the optical amplifier having the above circuit configuration, the incoming optical signal is split in the optical splitter, and the first split signal is converted in the second photodetector element to the second electrical signal, and is inputted into the correction signal generation circuit. The second split signal is inputted into the wavelength multiplexer after a delay time of a specific duration.

By doing so, the correction signal generation circuit generates a correction signal in accordance with the second electrical signal, and the excitation light driving circuit drives the monitor-equipped excitation light source in accordance with the monitor signal, the first electrical signal and the correction signal. Therefore, the first split signal inputted into the wavelength multiplexer is inputted from the one end of the optical fiber, amplified within the optical fiber and is outputted from the optical output terminal through the optical coupler. The resulting output optical signal is distortion-free and stable over a prolonged period of time.

BRIEF DESCRIPTION OF THE DRAWINGS

FIG. 4A to FIG. 4F show various examples of the waveforms to be inputted into the correction signal generation circuit.

PREFERRED EMBODIMENT OF THE INVENTION

Figure 1:
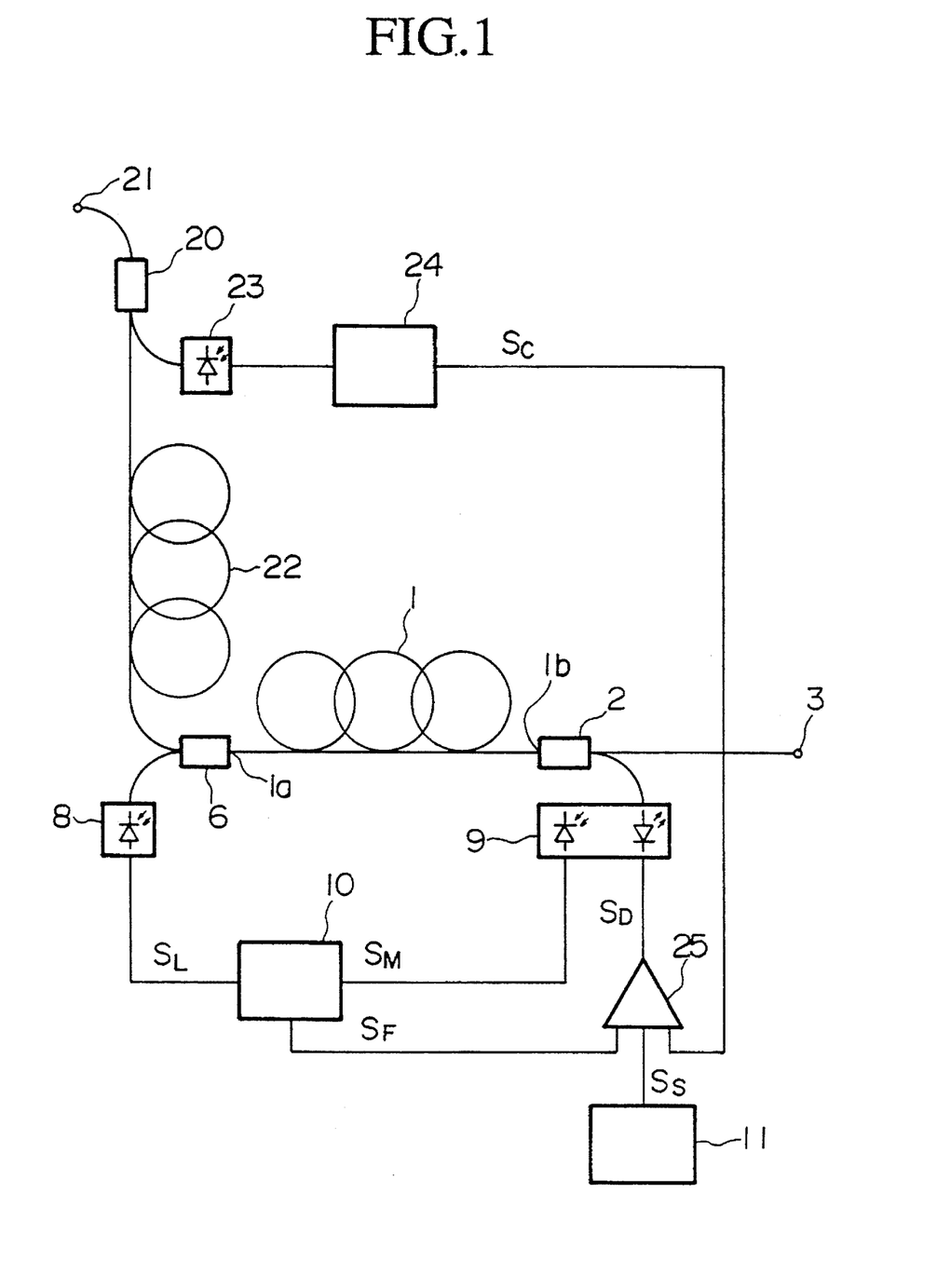
FIG. 1 is a schematic drawing showing the construction of an embodiment of the optical amplifier of the present invention.

In the following, a preferred embodiment will be presented with reference to the drawings. FIG. 1 is a schematic representation of the embodiment of the optical amplifier of the present invention. Those components which correspond to those shown in FIG. 8 will be referred to by the same reference numerals, and their explanations will be omitted. In FIG. 1, the optical splitter 20 splits an optical signal inputted from the optical input terminal 21 to be amplified, and delivers each signal to an optical delay circuit 22 and a photodetector element 23.

The optical delay circuit 22 delays the input optical signal for a specific period of time, and inputs the optical signal into a wavelength multiplexer 6. The photodetector element 23 converts the input optical signal to an electrical signal which is inputted into a correction signal generation circuit 24. When the electrical input signal increases at a rate exceeding a specific rate, the correction signal generation circuit 24 generates a correction signal $S_C$ of a waveform, for example, shown in FIG. 2A and inputs the correction signal $S_C$ in the addition circuit 25. The addition circuit 25 adds the correction signal $S_C$ supplied by the correction signal generation circuit 24, the feedback signal $S_F$ supplied by the division circuit 10 and the standard signal $S_S$ supplied by the standard electrical source circuit 11, and inputs the resulting excitation light source driving signal $S_D$ into the monitor-equipped excitation light source 9.

Next, the operation of the optical amplifier will be explained.

The input optical signal inputted into the optical input terminal 21 is split by the optical splitter 20 into a split signal to the photodetector 23 and to another split signal to the optical delay circuit 22. The optical signal to the optical delay circuit 22 is delayed in the optical delay circuit 22 for a specific duration of time, and then inputted into the one end 1a of the optical fiber 1 through the wavelength multiplexer 6.

The optical fiber 1 transforms the light energy of the excitation light (supplied from the monitor-equipped excitation light source 9 through the optical splitter 6, and injected into the other end 1b of the optical fiber 1) within the optical fiber 1 to excitation energy to effect light amplification. The excitation energy is accumulated within the optical fiber 1 while a part of the excitation energy is inputted as optical leakage signal into the photodetector element 8 through the wavelength multiplexer 6. The optical leakage signal inputted into the photodetector element 8 is converted to an electrical leakage signal $S_L$, and is inputted into the division circuit 10.

The monitor-equipped excitation light source 9 generates, in accordance with the light intensity of the excitation light which itself is generating, and outputs a monitor signal $S_M$ from the monitor signal output terminal, and supplies the monitor signal $S_M$ to the division circuit 10. The division circuit 10 divides the optical leakage signal $S_L$ (supplied by the photodetector element 8) with the monitor signal $S_M$ (supplied by the monitor-equipped excitation light source 9). The output signal from the division circuit 10 is supplied to the addition circuit 25 as a feedback signal $S_F$.

In the addition circuit 25, the feedback signal $S_F$, the standard signal $S_S$ supplied by the electrical source circuit 11 and the correction signal $S_C$ supplied by the correction signal generation circuit 24 are added, and the addition result is supplied to the monitor-equipped excitation light source 9 as the excitation light source driving signal $S_D$. The monitor-equipped excitation light source 9, after converting the excitation light source driving signal $S_D$ to excitation light, injects the excitation light into the other end 1b of the optical fiber 1 through the optical coupler 2.

The correction signal $S_C$ is generated in the correction signal generation circuit 24 by the steps described below. The split optical signal supplied to the photodetector element 23 by the optical splitter 20 is converted to an electrical signal therein, and is supplied to the correction signal generation circuit 24. The correction signal generation circuit 24 generates a correction signal $S_D$, such as the one shown in FIG. 2A when the input optical signal increases quicker than a specific rate.

Figure 2A:
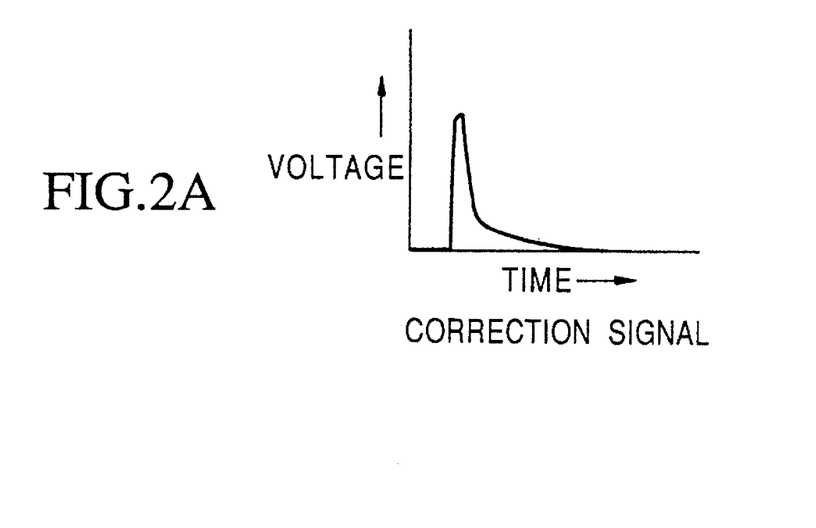
FIG. 2A shows examples of the waveforms of the correction signal.

When the correction signal $S_C$ is supplied to the addition circuit 25, the amount of light energy (emitted from the excitation source 9 through the optical coupler 2 and injected into the optical fiber 1) increases by the amount represented under the curve of the waveform for the correction signal $S_C$ shown in FIG. 2A in response to a sudden increase in the optical signal inputted from the optical input terminal 21. However the optical gain of the optical fiber 1 does not increase immediately, but increases after a time delay of several hundred micro-seconds or several milli-seconds subsequent to the increase in the light energy of the excitation light emitted from the monitor-equipped excitation light source 9. Therefore, immediately after the increase in the light energy from the light source 9 in accordance with the correction signal $S_C$, the amplification gain of the optical fiber 1 does not change, and it follows that the feedback circuit, comprising the photodetector element 8, monitor-equipped excitation light source 9, the division circuit 10 and the addition circuit 25, does not respond to the correction signal $S_C$.

Therefore, if the optical signal is inputted into the one end 1a of the optical fiber 1 before the excitation energy within the optical fiber 1 is increased by the amount of light energy in accordance with the correction signal $S_C$, the output optical signal will be distorted in the same way as illustrated in FIG. 7 in the conventional optical amplifier.

Therefore, in this embodiment, the timing of the optical signal input into the one end 1a of the optical fiber 1 is delayed with the use of the optical delay circuit 22. The optical delay circuit 22 is able to match the timing of build-up in the amplification gain within the optical fiber 1 in accordance with the correction signal $S_C$ with the timing of inputting the input optical signal into the one end 1a of the optical fiber 1.

Figure 2B:
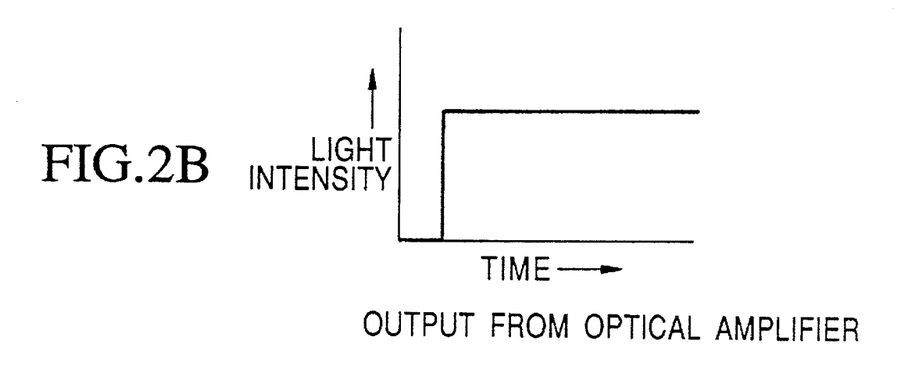
FIG. 2B shows the optical signal from the optical output terminal.

It is clear that, according to the operation of the circuit configuration presented, it is possible to obtain distortion-free output optical signal having a stable output level from the optical output terminal 3 as shown in FIG. 2B.

Figure 3:
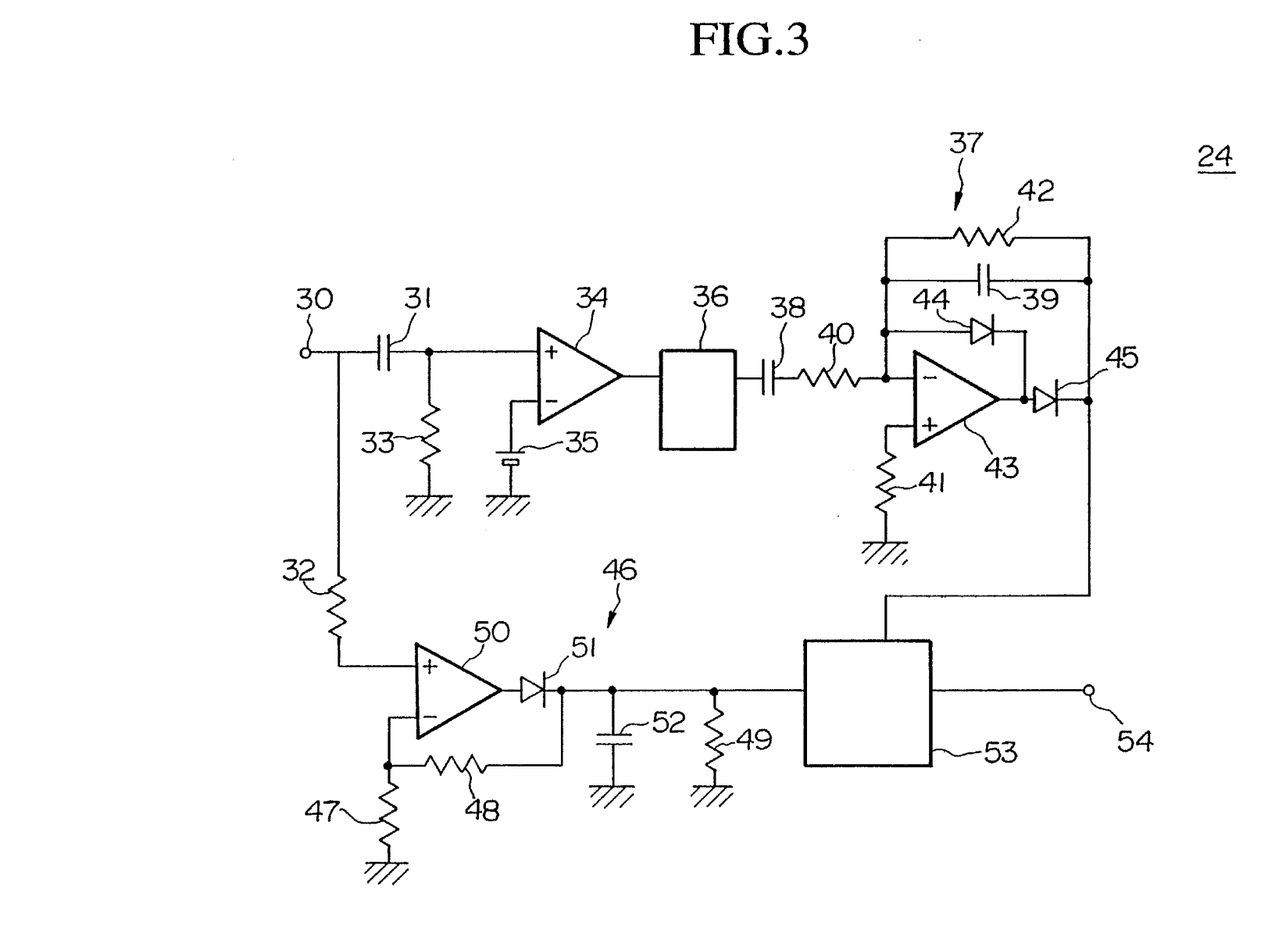
FIG. 3 shows an example of the electrical circuit configuration for the correction signal generation circuit.
Figure 4A:
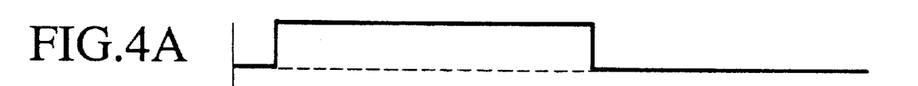

Next, the details of the structure and operation of the correction signal generation circuit 24 shown in FIG. 1 will be explained with reference to FIGS. 3 and 4. The signal inputted into the input terminal 30 is an electrical signal obtained by converting the optical signal inputted from the optical input terminal 21 in the photodetector element 23. If the input optical signal is a shot type rectangular waveform signal, it may be represented by waveform A in FIG. 4. The electrical signal inputted from the input terminal 30 is applied to one end of a condenser 31 and one end of a resistor 32.

The signal applied to one end of the condenser 31 is differentiated by a differentiation circuit comprising a condenser 31 and a resistor 33, and becomes a differential signal represented by the waveform B in FIG. 4, and is inputted into a non-inversion input terminal of a comparator 34. The signal inputted into the non-inversion input terminal of the comparator 34 is compared with the standard voltage of the reference voltage source 35 by the comparator 34, and only those signals having a signal level above a predetermined value are selected, and are inputted as a trigger signal into a pulse generation circuit 36.

Figures 4B, 4C:
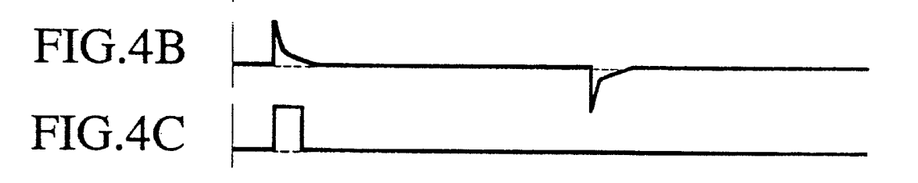
Figure 4D:
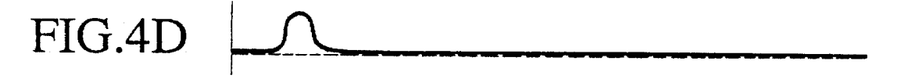

The pulse generation circuit 36 is a monostable multivibrator operated by the output signal from the comparator 34 or a timer circuit, and generates pulse signals of a constant pulse width (refer to waveform C in FIG. 4) which is needed to generate the correction signal $S_C$ (refer to waveform 2A) in the waveform correction circuit 37. The generated pulse is then supplied to a condenser 38.

The waveform correction circuit 37 comprises condensers 38, 39, resistors 40–42, an operational amplifier 43 and diodes 44, 45, and is designed to perform differentiation/integration functions as well as a signal detection function, and converts the pulse signal (refer to waveform C in FIG. 4) supplied by the pulse generation circuit 21 to a signal having a waveform shown by waveform D in FIG. 4. The output signal from the waveform correction circuit 37 is formed by the pulse signals generated by the pulse signal generation circuit 36, and therefore, the amplitude of the waveform is independent of the signal levels inputted from the input terminal 30, and remains constant.

Figure 4E:
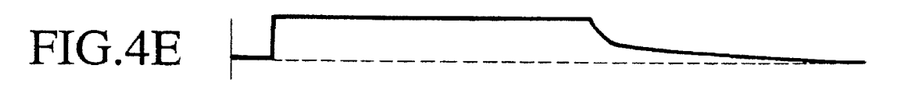
Figure 4F:
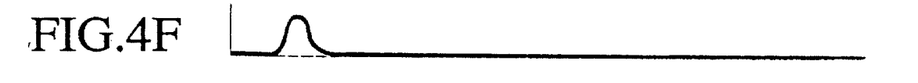

In the meantime, the signal inputted from the input terminal 30 and applied to one end of the resistor 32 is inputted into a maximum value retention circuit 46. The maximum value retention circuit 46 comprises resistors 47–49, an operational amplifier 50, a diode 51 and a condenser 52, and retains the maximum value in the condenser 52. The resistor 49 is for use in discharging the signal voltage stored in the condenser 52. The waveform of the signal (having the waveform A in FIG. 4), applied to the input terminal 30 and to one end of the resistor 32, becomes a waveform E shown in FIG. 4 by the action of the maximum value retention circuit 46 presented above.

The variable-gain amplifier 53 amplifies the output signal from the waveform correction circuit 37 (refer to waveform D in FIG. 4) to various degrees of amplification, in accordance with the output signal (refer to waveform E in FIG. 4) from the maximum value retention circuit 46, and outputs the resulting signal having a waveform F in FIG. 4 from the output terminal 54. Accordingly, the output signal from the waveform correction circuit 37 inputted from the input terminal 30, which has been unrelated to the level of the input signal from the input terminal 30, is made proportional to the maximum value of the signal from the input terminal 30. In other words, this step enables the correction signal generation circuit 24 to output a correction signal $S_C$ of a waveform shown in FIG. 2A from the output terminal 54, and having a level appropriate to the electrical signal inputted into the input terminal 30.

The embodiment was explained with specific reference to the drawings and the circuit configurations included in this embodiment, but it is obvious that other circuit variations within the scope of the design concept of this invention are applicable. It is important in the design to allow for the time-dependent process of the excitation energy generation and consumption taking place within the rare-earth doped optical fibers in setting the feedback timing of the input optical signal.

What is claimed is:

1. An optical amplifier comprising:

a rare-earth doped optical fiber produced by doping an optical fiber material with rare-earth elements;

a first photodetector element for converting an optical input signal to a first electrical signal;

a wavelength multiplexer for inputting said optical input signal into one end of said rare-earth doped optical fiber, and for inputting a leakage signal emitted from said one end of said rare-earth doped optical fiber into said first photodetector element;

a monitor-equipped excitation light source for generating an excitation light, and for generating a monitor signal in proportion to a light intensity of said excitation light;

an optical coupler for guiding an optical signal outputted from other end of said rare-earth doped optical fiber to an optical output terminal, and for inputting said excitation light into said other end of said rare-earth doped optical fiber;

an excitation light source driving circuit for driving said monitor-equipped excitation light source in accordance with said monitor signal and said first electrical signal so as to amplify said optical input signal by a process of accumulating excitation energy within said rare-earth doped optical fiber by transforming light energy, supplied by said excitation light injected into said other end of said rare-earth doped optical fiber, to excitation energy and converting said excitation energy to an optical signal having wavelength and phase characteristics identical to the wavelength and phase characteristics of said input optical signal inputted into said one end of said rare-earth doped optical fiber;

wherein said optical amplifier is provided with an optical splitter for splitting an incoming optical signal to be amplified into a first split signal and a second split signal; a second photodetector element for converting said first split signal produced by said optical splitter to a second electrical signal; a correction signal generation circuit for generating a correction signal in accordance with said second electrical signal; and an optical delay circuit for delaying said second split signal for a specific duration of time prior to inputting into said wavelength multiplexer; and wherein said excitation light source driving circuit regulates operation of said monitor-equipped excitation source in accordance with said monitor signal, said first electrical signal and said correction signal.

2. An optical amplifier as claimed in claim 1, wherein said correction signal generation circuit comprises:

a differentiation circuit for differentiating said second electrical signal with respect to time to generate a differential signal;

a comparator for comparing said differential signal with a standard voltage;

a pulse generation circuit, for generating a pulse signal having a constant pulse width, operated by an output signal from said comparator acting as a trigger signal;

a waveform correction circuit for differentiating and detecting said pulse signal to generate a signal having a specific waveform;

a maximum value retention circuit for retaining a maximum value of said second electrical signal;

a variable-gain amplifier for amplifying said signal having a specific waveform generated by said waveform correction circuit in accordance with an output signal from said maximum value retention circuit to generate a correction signal.

* * * * *